US006674714B1

(12) United States Patent
Mochizuki et al.

(10) Patent No.: US 6,674,714 B1
(45) Date of Patent: Jan. 6, 2004

(54) RETAINMENT OF ALARM EVENTS DURING WAIT RESTORE (WTR) CYCLE OF CHANNEL RESTORATION AND SQUELCH TABLE WITH REDUCED MEMORY AREA

(75) Inventors: Hideaki Mochizuki, Kawasaki (JP); Ritsuko Isonuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/369,239

(22) Filed: Aug. 5, 1999

(30) Foreign Application Priority Data

Oct. 26, 1998 (JP) ............................... 10-304396

(51) Int. Cl.[7] ................................. H04J 3/14
(52) U.S. Cl. ..................... 370/217; 370/222; 370/242
(58) Field of Search ............................ 370/222, 223, 370/228, 248, 249, 217, 218, 219, 220, 224, 225, 229

(56) References Cited

U.S. PATENT DOCUMENTS

| 5,491,696 A | * | 2/1996 | Nishimura | 370/225 |
| 5,537,393 A | * | 7/1996 | Shioda et al. | 370/223 |
| 5,574,719 A | | 11/1996 | Ishiwatari | |
| 5,757,768 A | * | 5/1998 | Goto et al. | 370/222 |

FOREIGN PATENT DOCUMENTS

| JP | 6-188866 | 7/1994 |
| JP | 8-316978 | 11/1996 |
| JP | 9-93278 | 4/1997 |

* cited by examiner

Primary Examiner—Chau Nguyen
Assistant Examiner—Soon-Dong Hyun
(74) Attorney, Agent, or Firm—Katten Muchin Zavis Rosenman

(57) ABSTRACT

A transmission device which cross connects channels on a synchronous multiplex transmission network which forms a ring, and which performs restoration of communication by looping back signals in a protection path when a failure occurs includes a memory area which stores information for determining whether an alarm indication signal needs to be inserted in a channel or not, wherein the size of the memory area corresponds to the number of channels targeted for the restoration, and a part which inserts said alarm indication signal in a channel by switching results of the determination according to predetermined information. Further, the transmission device may switch and recover a path without skipping an event which arises between polling accesses by a CPU of said transmission device. Furthermore, the transmission device may include a part, provided in each interface part, which performs phase adjusting of channel signals.

4 Claims, 19 Drawing Sheets

RETAINMENT OF ALARM EVENTS DURING WAIT RESTORE (WTR) CYCLE OF CHANNEL RESTORATION AND SQUELCH TABLE WITH REDUCED MEMORY AREA

BACKGROUND OF THE INVENTION

1. Field of the Invention

The present invention generally relates to a transmission device. More particularly, the present invention relates to a transmission device which adapts to various network configurations in a synchronous multiplex transmission network.

2. Description of the Related Art

Because of an increase of traffic, the use of synchronous multiplex transmission which utilizes optical communications for high-capacity transmission is in high demand. Especially, a synchronous multiplex transmission system which has a capability of transmission line switching in case of transmission line failure and which can form a ring, such as SONET, is widely used from the viewpoint of supporting diverse network configurations and ensuring reliability of a network.

An ADM (Add/Drop multiplexer) device, for example, is used as a transmission node of a synchronous multiplex ring transmission network. The ADM device can access a desired VT channel in an STS signal, where STS is a channel hierarchy of SONET.

FIGS. 1A and 1B are conceptual diagrams for explaining UPSR which is a transmission line switching system in a SONET ring network. UPSR, an abbreviation of Unidirectional Path Switched Ring, is an example of a system in which a path is switched and is recovered by selecting, at a receiving node, either of two path signals which are sent in two different directions over the synchronous multiplex transmission network from a sending node. In FIGS. 1A and 1B, each of a node A 1, a node B 2, a node C 3, and a node D 4 is a node which constitutes a SONET ring, and FIGS. 1A and B show a case in which a signal enters the node A 1 and exits from the node C 3.

In FIG. 1A, a signal which enters the node A 1 is sent along two routes, one of the routes going through the node A 1, the node D 4, and the node C 3 and another route going through the node A 1, the node B 2, and the node C 3. Then, the signal from the route along the node A 1, the node D 4, and the node C 3 is selected under normal conditions at the node C 3. A path in a route selected under normal conditions, such as the route along the node A 1, the node D 4, and the node C 3 in the case of FIG. 1, will be called a default path hereinafter.

As shown in FIG. 1B, if a fault occurs in a path between the node A 1 and the node D 4, which fault will cause a communication interruption, the path is switched to a path in the route along the node A 1, the node B 2, and the node C 3 so that the communication continues. A path which is a destination of such a path switching from a default path, such as the path in the route along the node A 1, the node B 2, and the node C 3, will be called a non-default path hereinafter. In addition, the above-mentioned capability will be called path protection switching hereinafter.

FIGS. 2A and 2B are conceptual diagrams of BLSR in a SONET ring network. BLSR is an abbreviation of Bidirectional Line Switch Ring, and is an example of a system which carries out cross connecting on a synchronous multiplex ring transmission network and which restores communication by looping back a signal using a protection channel when a transmission line failure arises. In FIGS. 2A and 2B, each of the node A 1, the node B 2, the node C 3, and the node D 4 is a node which constitutes a SONET ring, and FIGS. 2A and 2B show a case in which a signal enters the node A 1 and exits from the node C 3.

As shown in FIG. 2A, initially, a signal which enters the node A 1 is sent to the node C 3 on the route along the node A 1, the node D 4, and the node C 3. Then, when a transmission failure occurs between the node A 1 and the node D 4, which transmission failure results in a communication interruption, the signal is transmitted through the node A 1, the node B 2, the node C 3, the node D 4, and the node C 3 by using a protection channel.

FIG. 3 shows, as an example, a system block diagram of a transmission device 5 which accesses a desired VT channel in any STS signal of SONET, and mainly shows a part for carrying out channel cross connecting. The transmission device 5 includes an STS cross-connecting part 10 for cross connecting an STS signal, a VT cross-connecting part 20 for cross connecting a VT signal, interface (INF) parts $30_1$–$30_n$, for inputting signals, and interface (INF) parts $40_1$–$40_n$ for outputting signals. The STS cross-connecting part 10 includes STS TSI parts 11, 12, 13 for performing cross connection of an STS signal, STS PSW parts 14, 15 for path protection switching in UPSR, and a selector (SEL) 16 for selecting either of a path accessed in the STS level or a path accessed in the VT level. The VT cross-connecting part 20 includes a VT SQL part 21 for performing VT squelch, a VT TSI part 22 for cross connecting a VT level signal, and a VT PSW part 23 for path protection switching in UPSR. Squelch is a process for inserting an alarm indication signal into an unrecoverable channel.

In FIG. 3, signals input from the INF parts $30_1$–$30_n$ branch to STS level signals and VT level signals at a branchpoint 24. The STS level signals enter the STS TSI part 12, and are cross connected in terms of STS level, and, if selected at the SEL part 16, the signals are output to the INF parts $40_1$–$40_n$ through the STS PSW part 15. The VT level signals are cross connected in the STS TSI part 11 at STS level, and enter the VT cross-connecting part 20 which cross connects the entered signals at the VT level. Then, through the TSI PSW part 23, the signals enter the STS TSI part 13 which cross connects the signals, and, if the signals are selected at the SEL part 16, the signals are output to the INF parts $40_1$–$40_n$. In addition, VT squelch is performed in the VT SQL part 21 in which an alarm indication signal (AIS) is inserted into a VT channel in which a misconnection occurs.

FIG. 4 is a conceptual diagram of a VT access ring for explaining the VT squelch. FIG. 4 shows a BLSR configuration which has two fibers, an inside one and an outside one. Each of the inside line and the outside line has a protection channel and an active channel of BLSR. As shown in FIG. 4, a VT signal added at the node C 3 goes through the node B 2 and is dropped at the node A 1. In this case, the squelch table of the node A 1 includes "2" as an STS level source node ID, "2" as an STS level destination node ID, and "3" as a VT level source node ID. If a failure occurs between an E point 6 and an F point 7, STS level squelch will not be carried out because the node A can recognize the node B in the STS level. As for the VT level, squelch will be carried out for the VT channel signal which has the source node ID "3" in the corresponding squelch table because the node A can not recognize the node C. A VT path AIS is inserted into the VT channel for which squelch is carried out.

FIG. 5 is a block diagram of a conventional VT SQL part 21 for performing the above-mentioned VT squelch. A squelch table setting part 60 includes registers which accommodate 28 VT channels per each of STS channels $60_1$–$60_n$, where data setting to each register is performed by a control part 67. "Far End Node ID", that is, the node ID of the farthest node among connected nodes to which data can be transmitted is sent to each of SQL decision parts $62_1$–$62_n$. For example, in the network shown in FIG. 4, when a failure arises at the F point 7, node ID "4" is sent from the node D to the node A. Each of the SQL decision parts $62_1$–$62_n$, determines whether VT squelch should be carried out or not on the basis of comparison between the "Far End Node ID" and the setting data in the squelch table setting part 60. The result of the decision is stored in each of the latching parts $64_1$–$64_2$. Then, a VT path AIS is inserted into channels which are applicable for squelch insertion in a squelch inserting (INS) part 66.

FIG. 6 is a block diagram of the STS PSW part 14, or 15, or VT PSW part 23 in FIG. 3, that is, a block diagram of a part for path protection switching of the above-mentioned UPSR. In FIG. 6, each of default side data 77 and non-default side data 78 is input into a selector (SEL) 76, and either of those data is selected and output. Each alarm of default side data 77 and non-default side data 78 is input to an ALM detection part 70 of a default side and an ALM detection part 71 of a non-default side respectively.

If the ALM detection part 70 of the default side or the ALM detection part 71 of the non-default side detects an alarm, the alarm is sent to an ALM notification register 72. In addition, the ALM detection part 70 of the default side or the ALM detection part 71 of the non-default side notifies a PSW control part 75 of the alarm. If the ALM detection part 70 of the default side detects an alarm during communication, path switching to the non-default side will be performed by the selector (SEL) 76 according to the control of the PSW control part 75.

Now, before a WTR control register 74 is described, WTR will be described. WTR, an abbreviation of "Wait To Restore", is a process in which if a default path is switched to a non-default path by a network failure, the default path is recovered from the non-default path after a predetermined time passes from the time when the failure of the default path is fixed.

Information of a working time of the WTR timer is recorded in a WTR control register 74 from a CPU 73. The CPU 73 reads the information and an alarm information stored in the ALM notification register 72 by a polling, and makes a decision on path selection. The PSW control part 75 outputs the path selection information to the selector (SEL) 76 which selects a path.

FIG. 7 is a time chart showing the operation of the above-mentioned WTR. The CPU 73 periodically reads the ALM notification register 72 by polling so as to monitor an alarm of the default path. When an alarm is detected in the default side at the timing of polling 2, the PSW control part switches the default path to the non-default side and keeps the state by the control of the WTR control register 74. After the CPU 73 recognizes a default side alarm at polling 2, when the CPU 73 recognizes disappearance of the alarm at polling 3, the WTR timer starts and the switched path is recovered by the PSW control part 75 if a default side alarm is not detected during the predetermined time of n minutes, which event is recognized by polling 6.

FIG. 8 is a block diagram of a conventional part for generating an STS signal and performing cross connection. Signals input into each of interface (INF) parts $80_1$–$80_n$ are assembled into an STS frame in each of the interface (INF) parts $80_1$–$80_n$, and the STS frame is output from each of interface (INF) parts $81_1$–$81_n$ after phase adjusting and cross connection is performed in a common part 90.

Since each of the interface (INF) parts $80_1$–$80_n$ has the same configuration as that of the interface (INF) part $80_1$, only the interface (INF) part $80_1$ will be described in the following. An STS frame generating part 82 generates an STS frame according to a timing pulse generated by a pulse generating part 84. The generated STS frame is multiplexed by a MUX 86 and sent to the common part 90. The pulse generating part 84 and the MUX 86 operate by a clock from a PLL 88. In addition, the PLL 88 receives a clock from a system clock 100.

The STS signals sent to the common part 90 are out of phase in channels. Therefore, the phase of each channel will be adjusted by replacing a pointer in each of pointer parts $92_1$–$92_n$. The phase adjusted signal of each channel is cross connected in a cross-connecting part 94 and sent to each of the interface (INF) parts $82_1$–$82_n$. The cross-connecting part 94 and the pointer parts $92_1$–$92_n$ are operated by a timing pulse from a pulse generating part 96 which operates by receiving a clock from a PLL 98.

FIG. 9 is a time chart showing the operation of the above-mentioned phase adjusting. Each of frames 1–n is generated by a timing pulse generated by the pulse generating part 84 in each of the interface (INF) parts $80_1$–$80_n$. The phase of each frame is adjusted according to common part reference timing from the pulse generating part 96 with the pointer processing in the pointer part $92_1$–$92_n$. In FIG. 9, A1 is a head byte of a frame and J1 is a head byte of a path. As shown in FIG. 9, the phase adjusting process by pointer replacement includes removing the frame which was made in the interface (INF) part from contained paths and accommodating the paths to a new frame.

Recently, as diversification of services is demanded, increased transmission capacity of a transmission device and diversification of a network configuration are demanded. In addition, for the transmission device, further downsizing such as miniaturization and low power consumption is required.

SUMMARY OF THE INVENTION

It is an object of the present invention to realize miniaturization of the transmission system and to improve the efficiency of the transmission device.

The above object of the present invention is achieved by a transmission device which cross connects channels on a synchronous multiplex transmission network which forms a ring, and which performs restoration of communication by looping back signals in a protection path when a failure occurs, the transmission device including:

a memory area which stores information for determining whether an alarm indication signal needs to be inserted in a channel or not, wherein the size of the memory area corresponds to the number of channels targeted for the restoration; and a part which inserts the alarm indication signal in a channel by switching results of the determination according to predetermined information.

According to the above invention, an unnecessary memory area such as unnecessary registers is eliminated and circuits are eliminated. Therefore, miniaturization of the transmission device can be realized.

The above object of the present invention is achieved also by a transmission device which includes a part for switching and recovering a path by selecting either of two path signals on a synchronous multiplex transmission network which forms a ring, wherein the transmission device switches and recovers a path without skipping an event which arises between polling accesses by a CPU of said transmission device.

According to the above invention, it is unnecessary to increase the number of CPU polling accesses. Therefore, efficiency of CPU processing can be achieved.

The above object of the present invention is achieved also by a transmission device which performs cross connection on a synchronous multiplex transmission network, the transmission device including:

a part, provided in each interface part, which performs phase adjusting of channel signals.

According to the above invention, since a pointer replacement circuit for phase adjusting is unnecessary in a common part, circuit concentration in the common part can be avoided, and miniaturization the transmission device and reduction of power consumption can be realized.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 5:
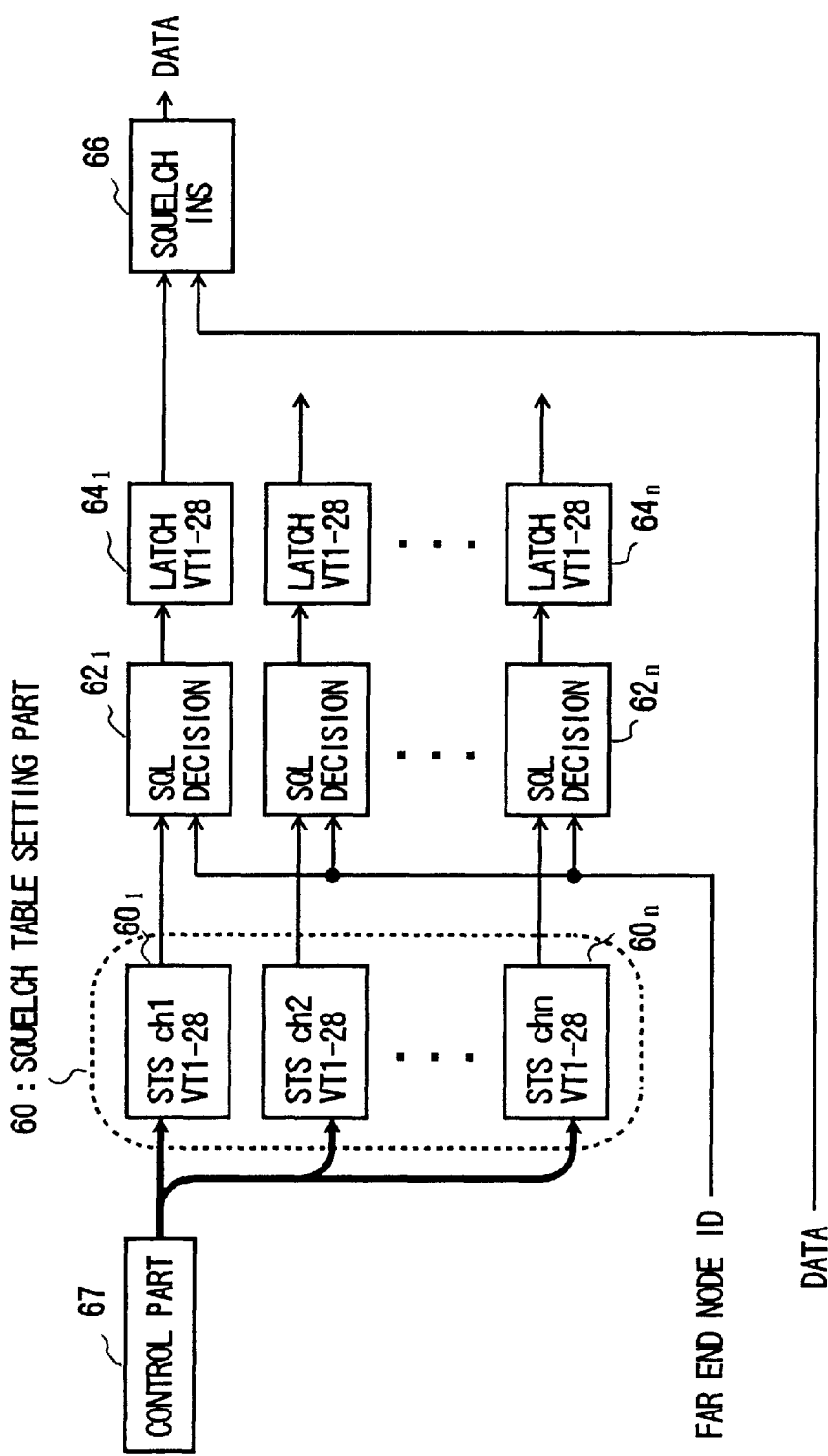
FIG. 5 is a block diagram showing a conventional VT SQL part.
Figure 6:
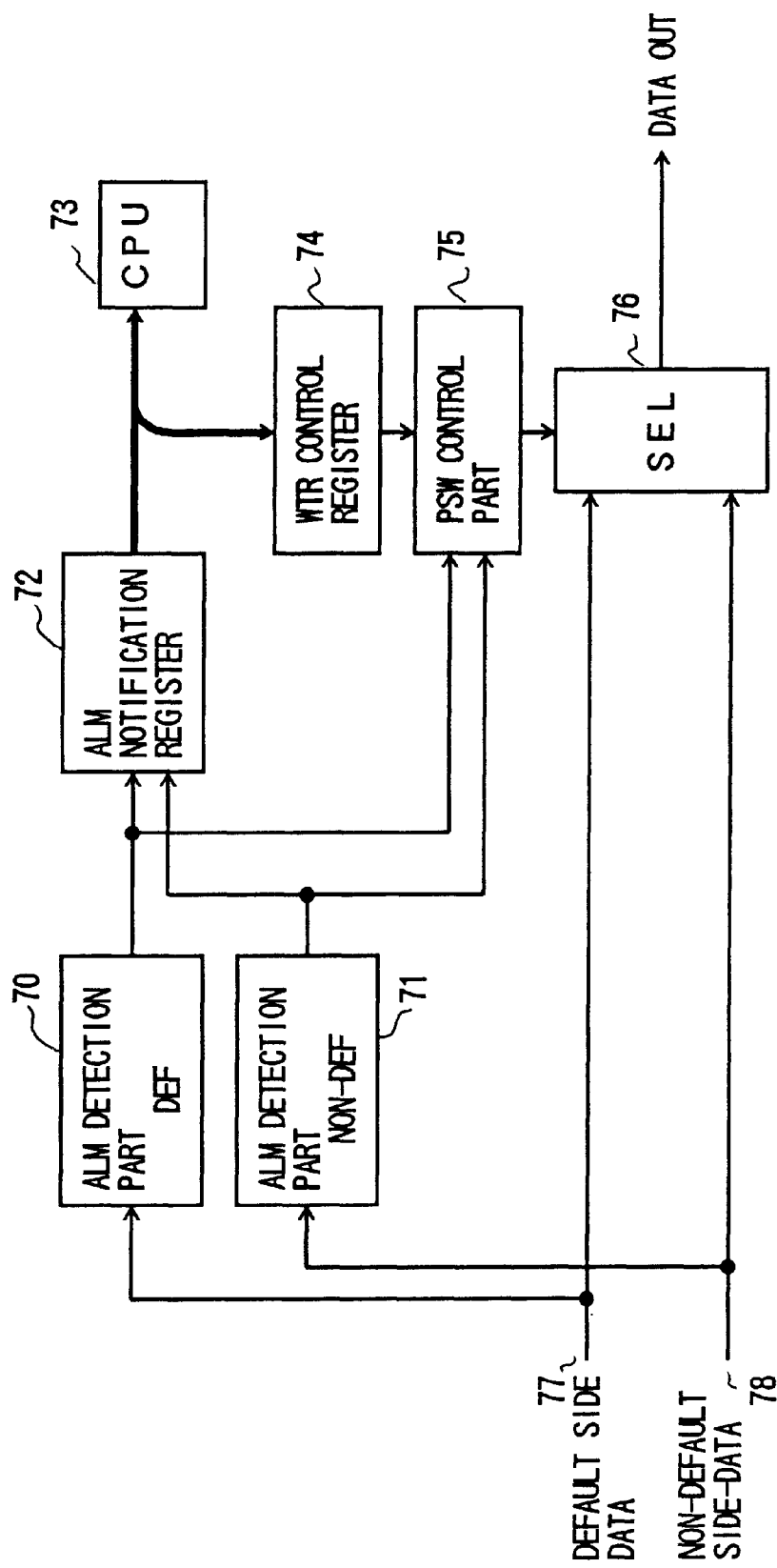
FIG. 6 is a block diagram showing a conventional part for performing path protection switching by UPSR in the transmission device.

In the conventional configuration shown in FIG. 5, the transmission device needs to have VT squelch table registers for all VT channels of the line side, because some of the VT channels which are used for BLSR can be switched to any channel when being cross connected. Therefore, according to the conventional configuration, the transmission device needs to have unnecessary registers even when only some of the channels of the line side are used for BLSR.

Therefore, it is required to configure the transmission device so as to include only necessary VT squelch registers equivalent to the number of the VT channels used for BLSR, that is, so as to include only a necessary memory area for VT channels targeted for restoration.

Figure 1A:
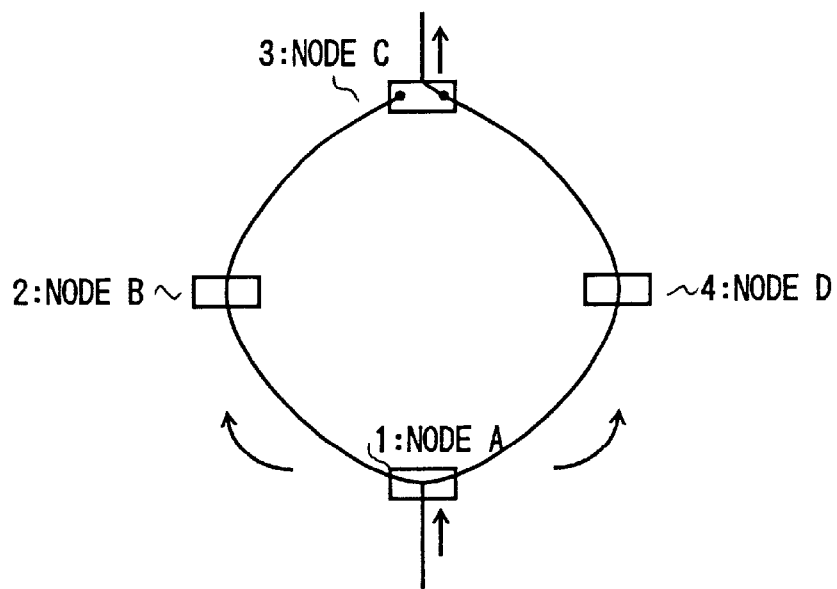
FIG. 1A is a first diagram for explaining UPSR in SONET.
Figure 1B:
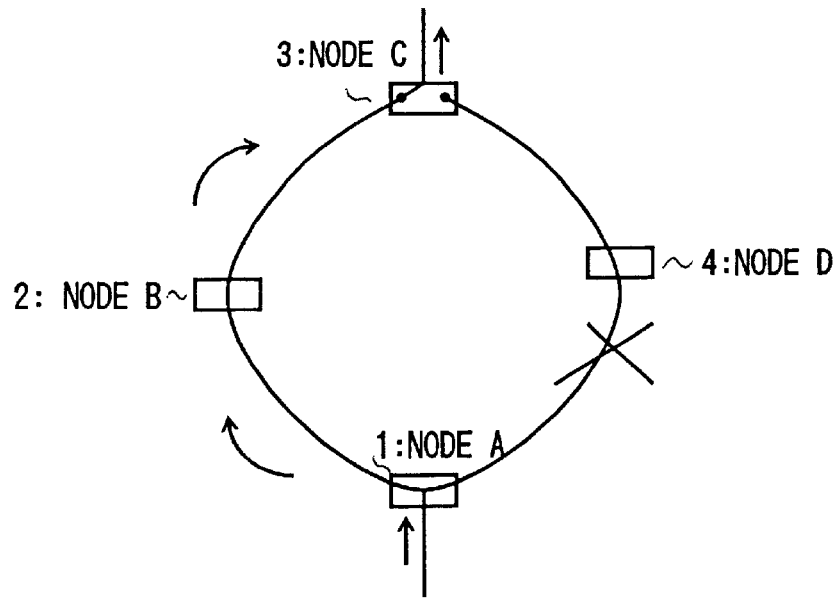
FIG. 1B is a second diagram for explaining UPSR in SONET.
Figure 2A:
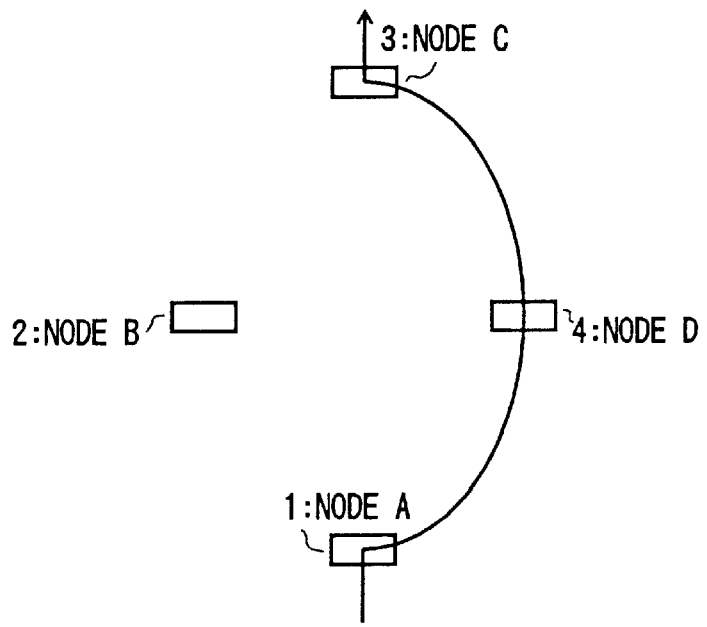
FIG. 2A is a first diagram for explaining BLSR in SONET.
Figure 2B:
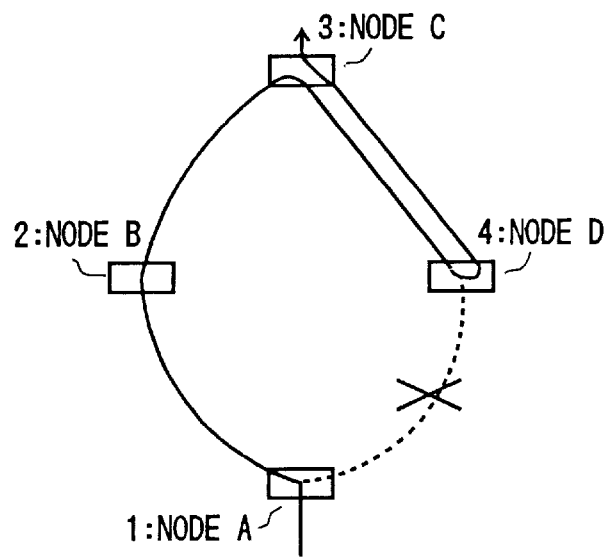
FIG. 2B is a second diagram for explaining BLSR in SONET.
Figure 3:
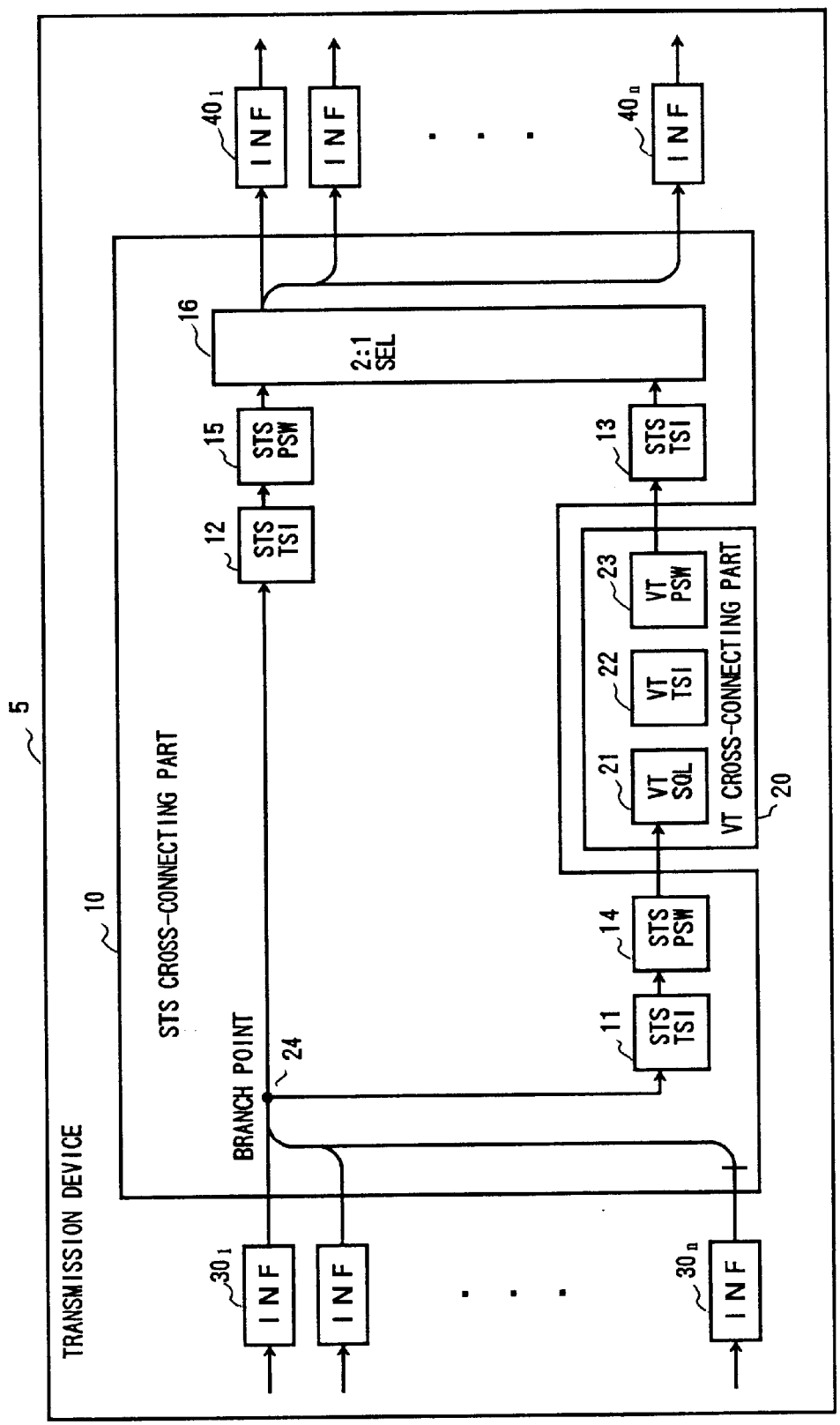
FIG. 3 is a block diagram showing a conventional transmission device.
Figure 4:
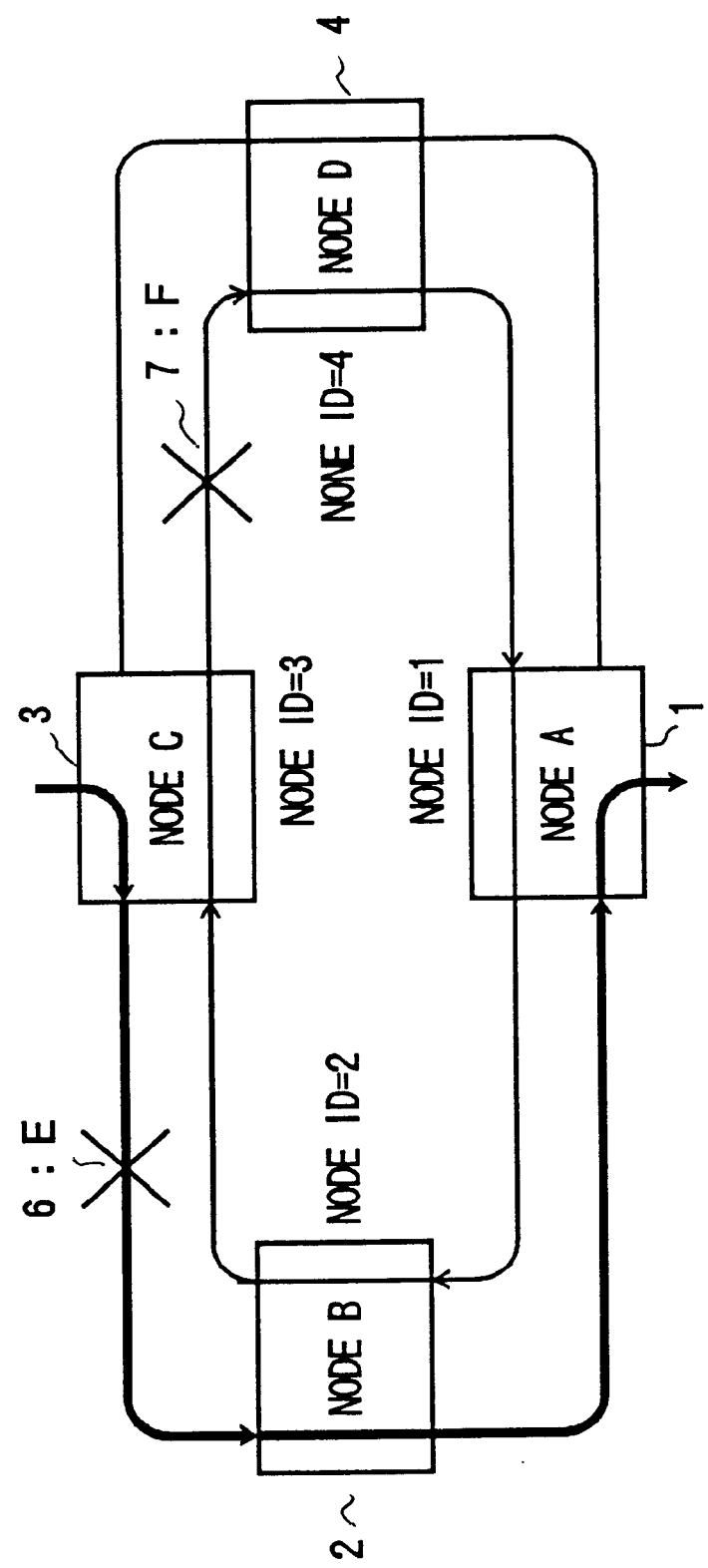
FIG. 4 is a diagram for explaining a VT squelch.
Figure 10:
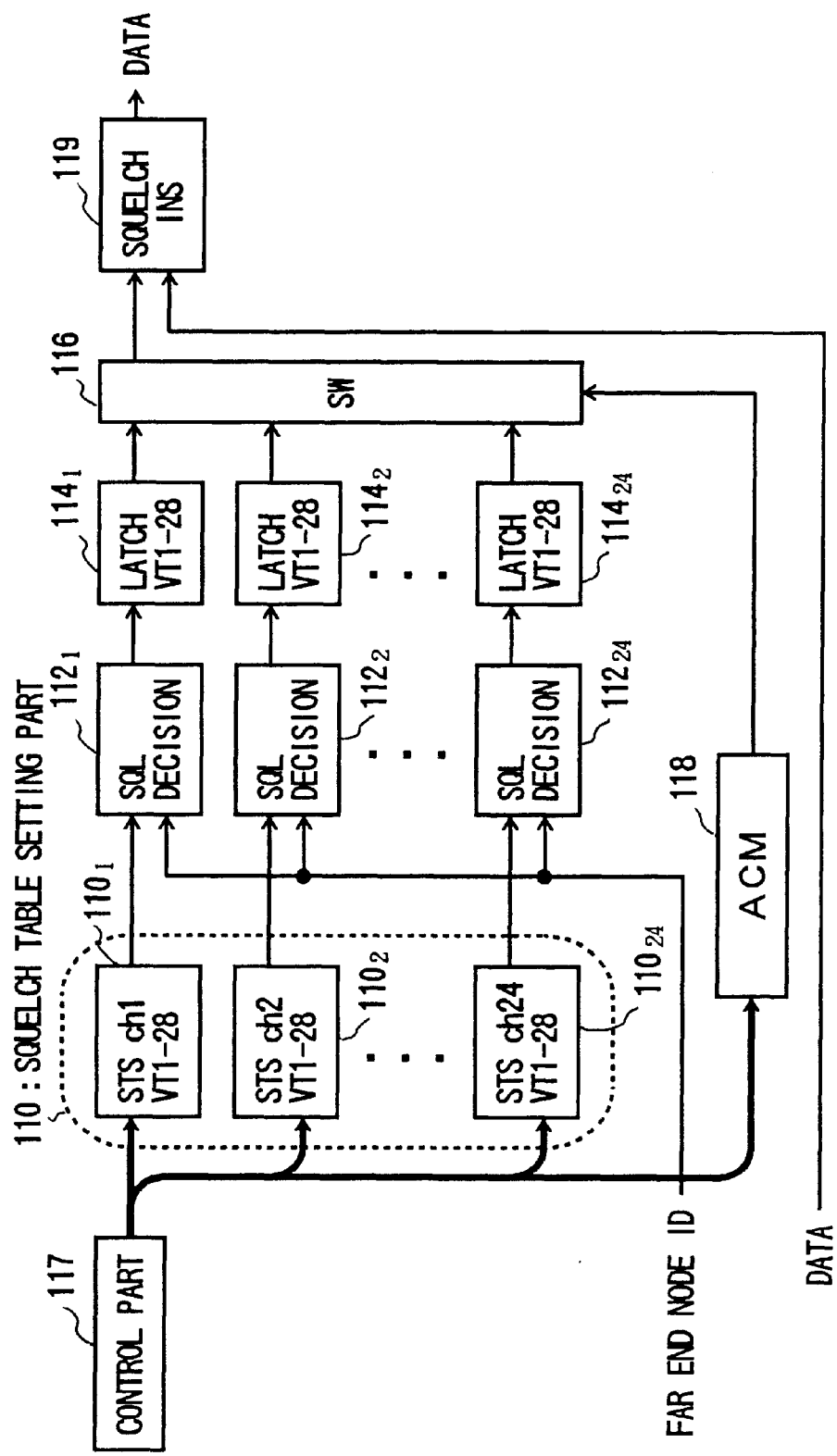
FIG. 10 is a block diagram showing the VT SQL part according to an embodiment of the present invention.

FIG. 10 is a block diagram of an embodiment of the present invention corresponding to the above requirement, which is a first requirement, and shows a part corresponding to the VT SQL 21 in FIG. 3. In this embodiment, 24 STS channels are used for BLSR in the transmission device.

A squelch table setting part 110 has registers for 28 VT channels per each of STS channel registers $110_1$–$110_{24}$ where the register value of each VT channel is set from a control part 117. The squelch table setting part 110 has only the capacity for channels targeted for BLSR. "Far End Node ID", that is, the node ID of the farthest node among connected nodes is sent to each of SQL decision parts $112_1$–$112_{24}$ which determine whether VT squelch should be carried out or not on the basis of comparison between the "Far End Node ID" and the setting data in the squelch table setting part 110. The result of the decision is stored in each of the latching parts $114_1$–$114_{24}$.

The results which are input into a switching (SW) part 116 in parallel are switched by designating STS numbers from an ACM (address control memory) 118 which is set on the basis of STS cross-connect information by the control part 117. Then, VT squelch is inserted into a corresponding VT channel in an squelch inserting (SQL INS) part 119.

Figure 11:
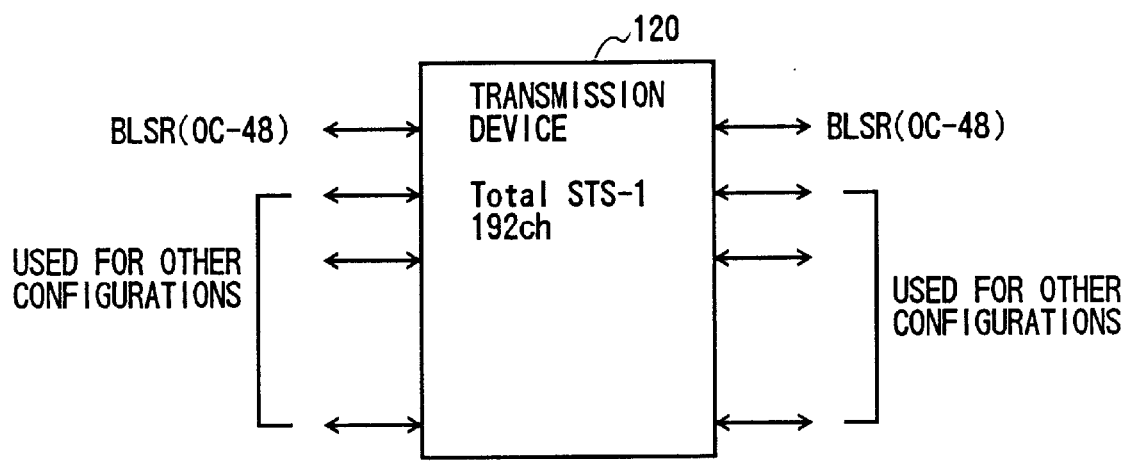
FIG. 11 is a diagram showing a configuration of a transmission device according to an embodiment of the present invention.

FIG. 11 shows an example of the configuration of a transmission device 120 according to another embodiment. The transmission device 120 shown in FIG. 11 includes 192 STS-1 channels of which 48 STS channels are used for BLSR. In this case, if the conventional method is applied, 5376 VT squelch table registers are necessary since a STS-1 channel includes 28 VT channels. On the other hand, according to the present invention, the transmission device 120 has only 1344 VT squelch table registers, because the number of STS-1 channels for use in BLSR is 48.

Figure 7:
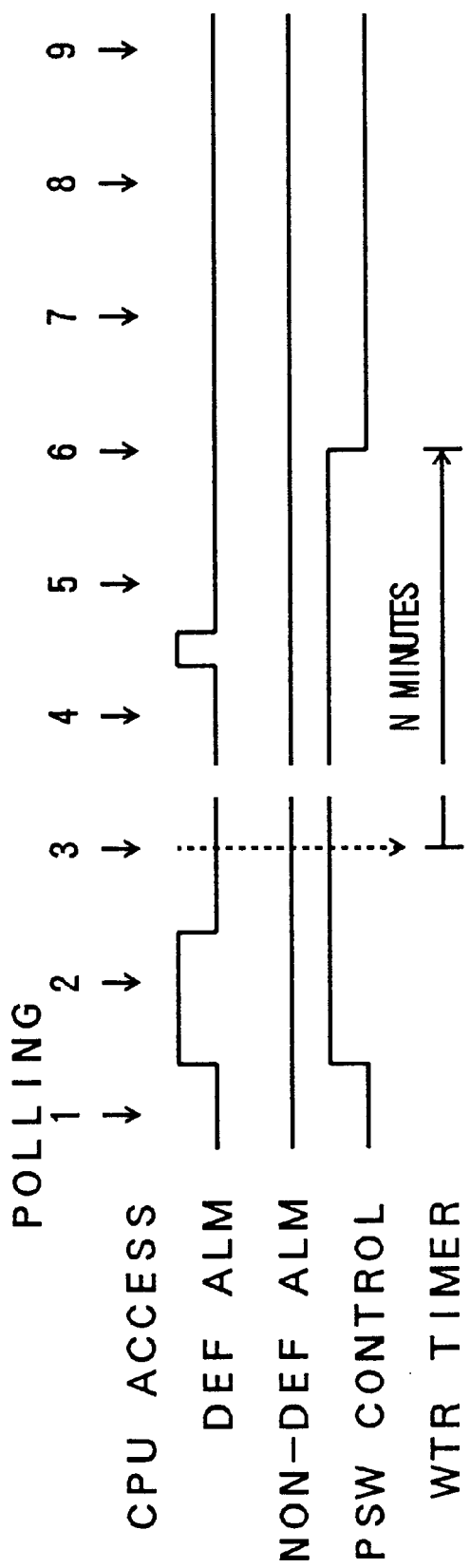
FIG. 7 is a time chart of the operation of the configuration shown in FIG. 6.

In the following, a second requirement will be described. The second requirement is related to recovery from the non-default path to the default path. In the time chart of FIG. 7, if an alarm in the default path is raised and disappears between polling 4 and polling 5, the WTR timer can not be reset because the operation of the CPU or software can not detect the alarm.

Therefore, the switched path recovers after a predetermined time starting from polling 3, although the predetermined time should have started from polling 5. This results in decreasing stability of communication. Reducing a polling interval as much as possible can solve this problem, but, it increases the load of the CPU. The second requirement is to solve this problem of skipping an alarm by the CPU without increasing the load of the CPU.

Figure 12:
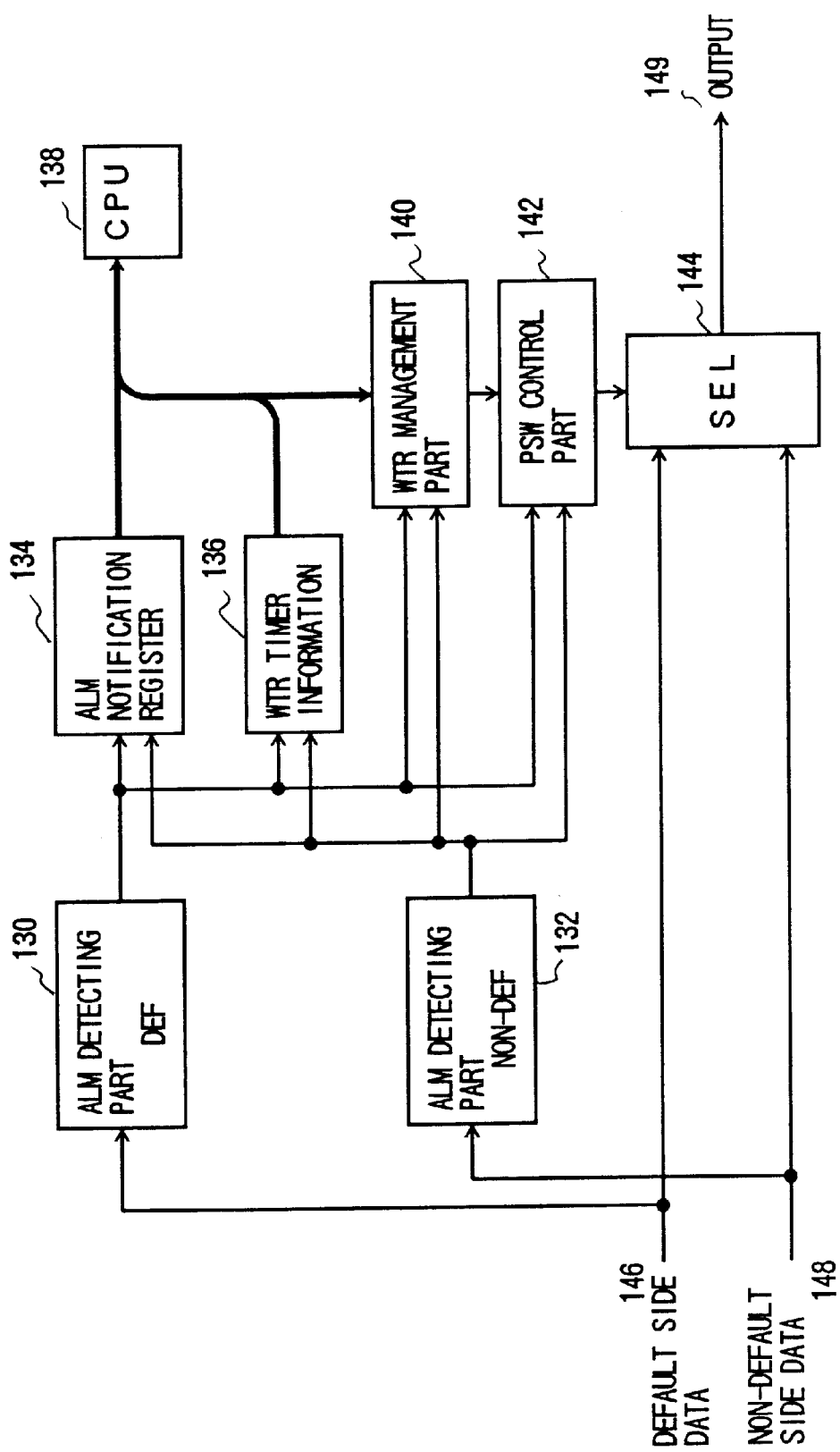
FIG. 12 is a block diagram showing a part for performing path protection switching by UPSR in the transmission device according to an embodiment of the present invention.

FIG. 12 is a block diagram showing an embodiment of the present invention corresponding to the second requirement. The block diagram shown in FIG. 12 corresponds to the STS PSW part 14, or 15, or VT PSW part 23 in FIG. 3, that is, a part for path protection switching of UPSR. In FIG. 12, each of default path side data 146 and non-default path side data 148 is input into a selector (SEL) 144, and either of those data is selected by being controlled by a PSW control part 142 and is output to an output 149. A default side ALM detection part 130 or a non-default side ALM detection part 132 detects an alarm when an alarm is raised in the default path side data 146 or the non-default path side data 148 respectively.

If the ALM detection part 130 of the default side or the ALM detection part 132 of the non-default side detects an alarm, the alarm is sent to an ALM notification register 134. In addition, the ALM detection part 130 or the ALM detection part 132 notifies a PSW control part 142 of the alarm. If the ALM detection part 130 of the default side detects an alarm during communication, path switching to the non-default side will be performed by the selector (SEL) 144 according to the control of the PSW control part 142.

A WTR timer information part 136 retains information of raising and disappearing of an alarm in the default path side. The WTR timer starts when a CPU 138 reads the information in the WTR timer information part 136.

A WTR management part 140 receives alarm information of the default side from the ALM detection part 130 directly, and retains management information for keeping a switched path in the nondefault side.

Figure 13:
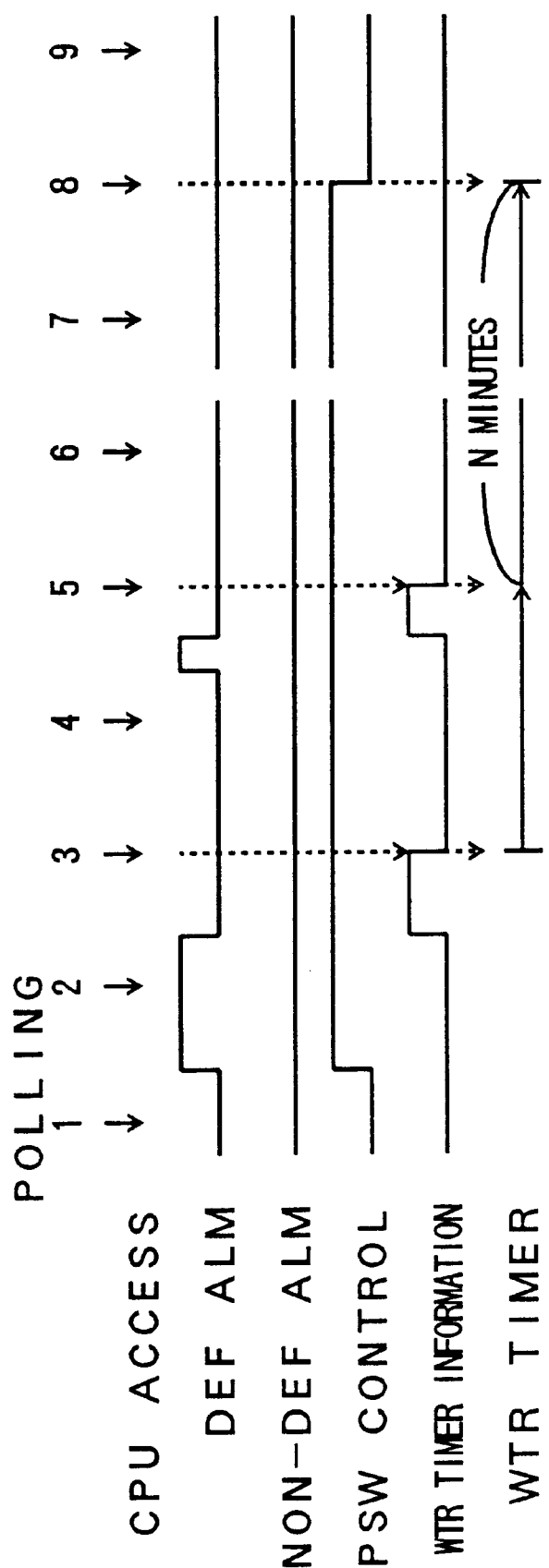
FIG. 13 is a time chart of the operation of the configuration shown in FIG. 12.

FIG. 13 is a time chart showing the operation of the above-mentioned configuration. As shown in FIG. 13, the PSW control part 142 works so as to switch a path to the non-default side when an alarm is raised in the default side between polling 1 and polling 2 of the CPU 138. When the alarm of the default side extinguishes between polling 2 and polling 3, the WTR timer information part 136 retains information of the event. When the CPU 138 recognizes the information in the WTR timer information part 136 by polling 3, the WTR timer starts. As shown in FIG. 13, an alarm in the default path is raised and disappears between polling 4 and polling 5. Although the CPU 138 can not recognize this event, the event is notified to the WTR timer information part 136 directly. Then, the WTR timer information part 136 retains the information, and, when the WTR timer information part 136 is read by polling 5, the WTR timer is reset and the monitoring period starts. After the monitoring period of n minutes have passed from the start of the timer, the PSW control part 142 works by polling 8 so as to recover the path to the default side.

Figure 14:
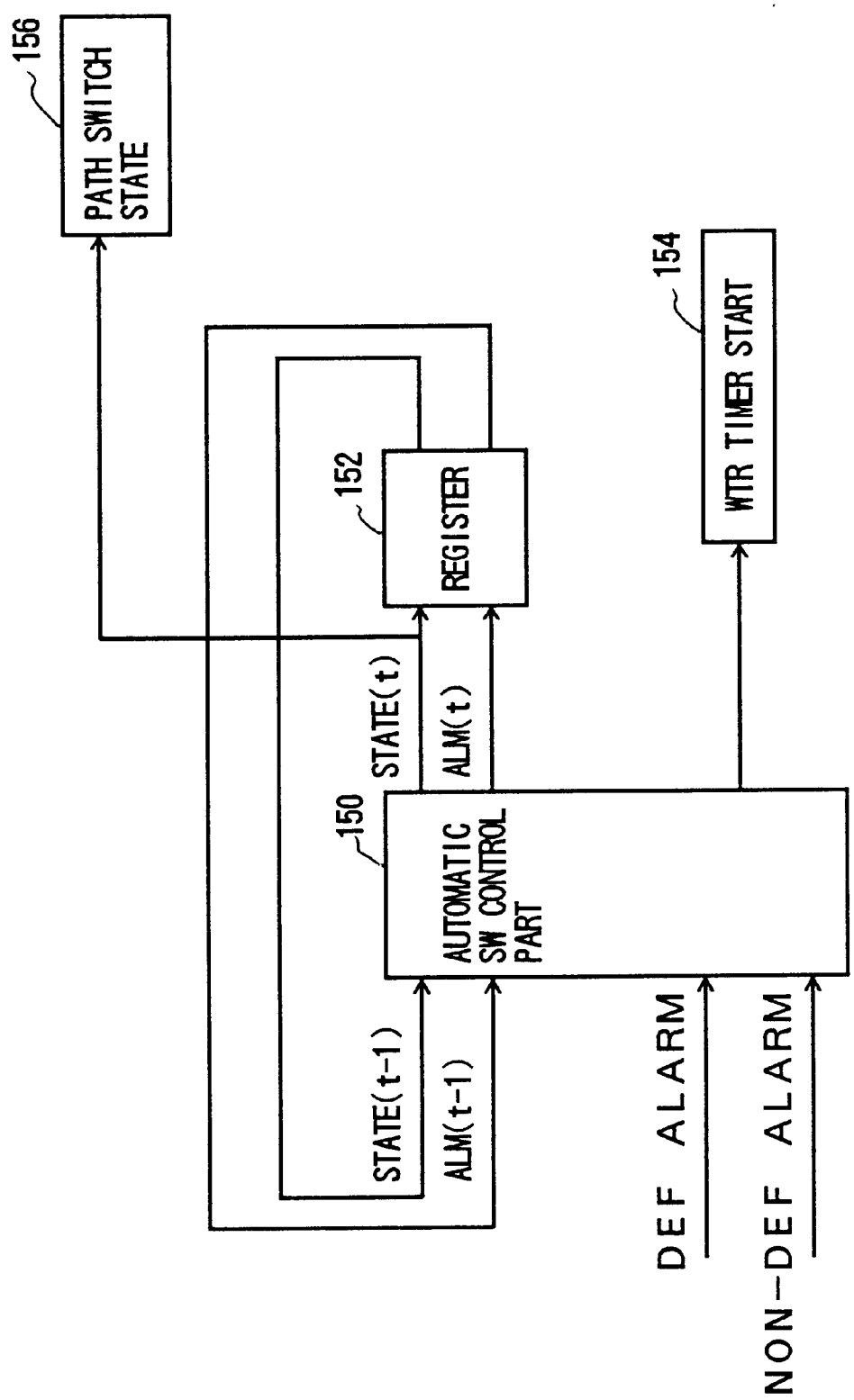
FIG. 14 is a block diagram showing a hardware configuration corresponding to the one shown in FIG. 12.

FIG. 14 is a block diagram showing a schematic hardware configuration corresponding to FIG. 12. FIG. 12 shows an example of one channel processing and FIG. 14 shows an example in which a plurality of channels are processed serially. Current states of an alarm of the default side and the non-default side (DEF alarm, non-DEF alarm) are input into an automatic switching (SW) control part 150. In addition, a previous state of the alarm (ALM(t−1)) and a previous state of the path switch (state(t−1)) are input. A register 152 retains current information of the path switch and the alarm. The automatic SW control part 150 compares the current state and the previous state, and outputs a WTR timer start signal 154 and a path switch state signal 156. For example, if an alarm was raised in the default side at the time of t−1 and the alarm has disappeared currently, a signal for starting the WTR timer is output.

Figure 8:
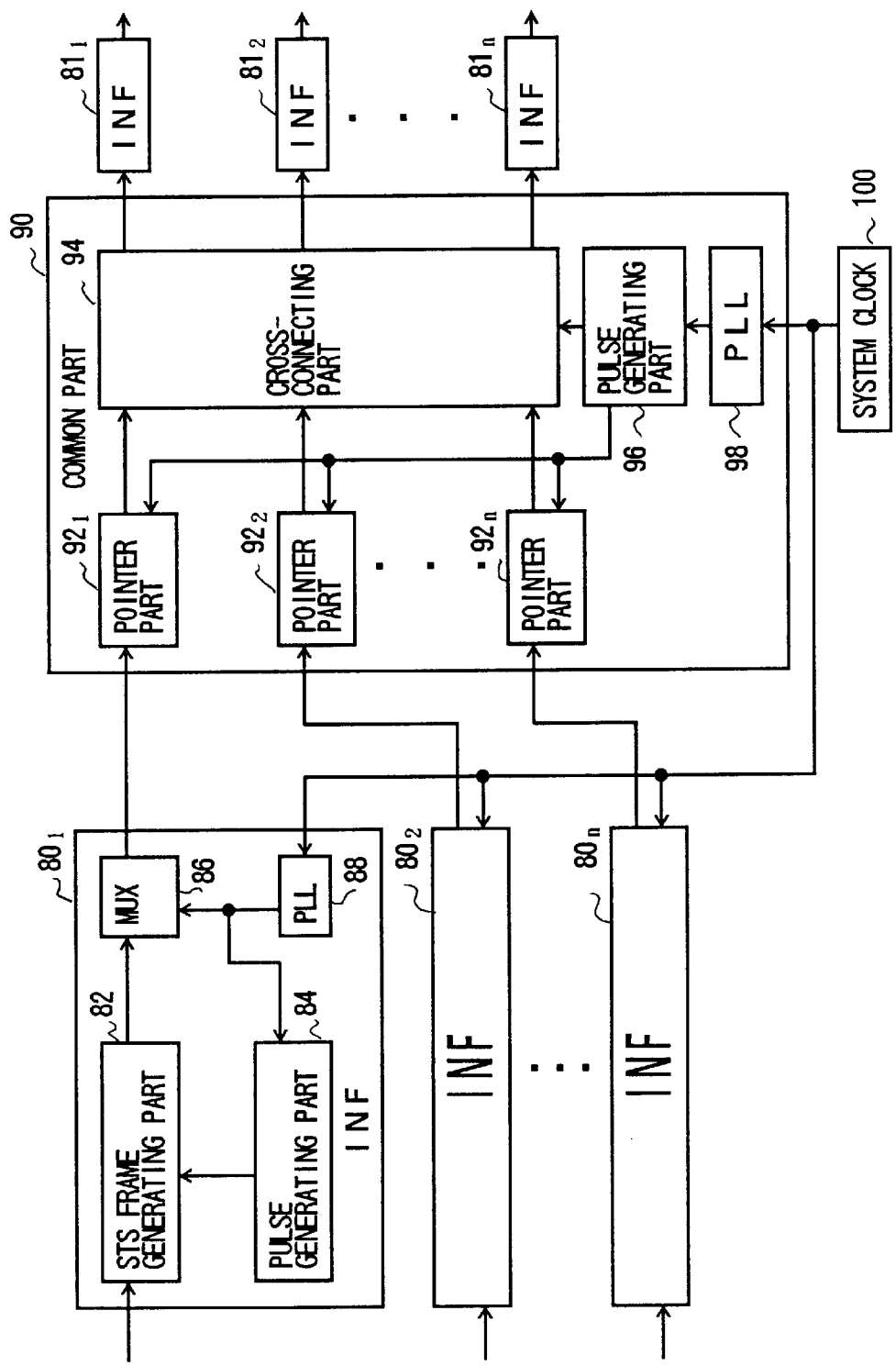
FIG. 8 is a block diagram showing a conventional configuration for generating an STS signal and performing cross connecting.
Figure 9:
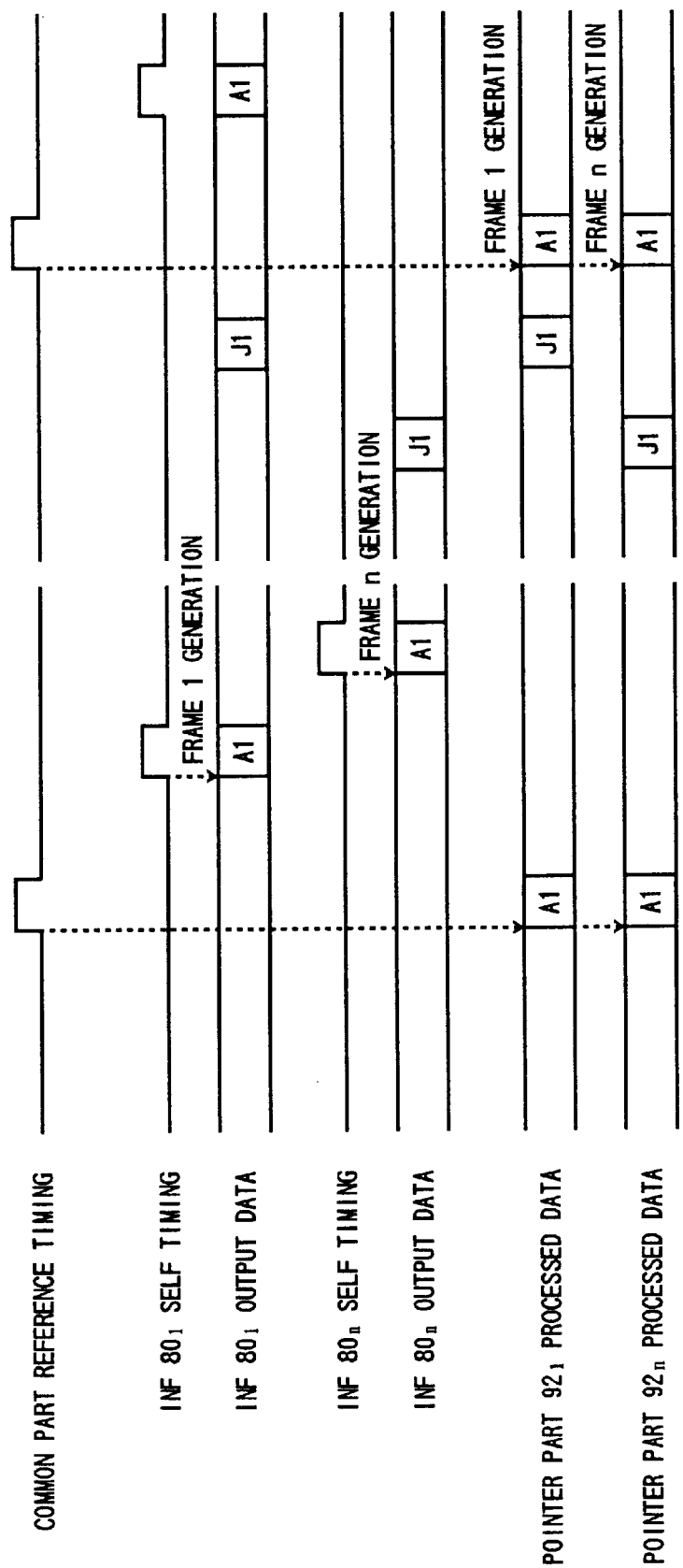
FIG. 9 is a time chart showing the operation of phase adjusting of STS signals according to a conventional technology.

In the following, a third requirement will be described. A third requirement relates to phase adjusting of STS channels when cross connection is performed, which was described with FIG. 8 and FIG. 9. As shown in FIG. 8, the phase of each channel is adjusted in the common part according to the conventional technique. However, since the capacity of the transmission device is increasing and signal capacity from each interface (INF) part is increasing recently, the size and the number of the circuits of the pointer part are also increasing. Further, since there are some interface signals which do not require pointer replacement, the configuration shown in FIG. 8 becomes inefficient. Thus, the third requirement is to avoid concentration of circuits in the common part so as to form an efficient configuration.

Figure 15:
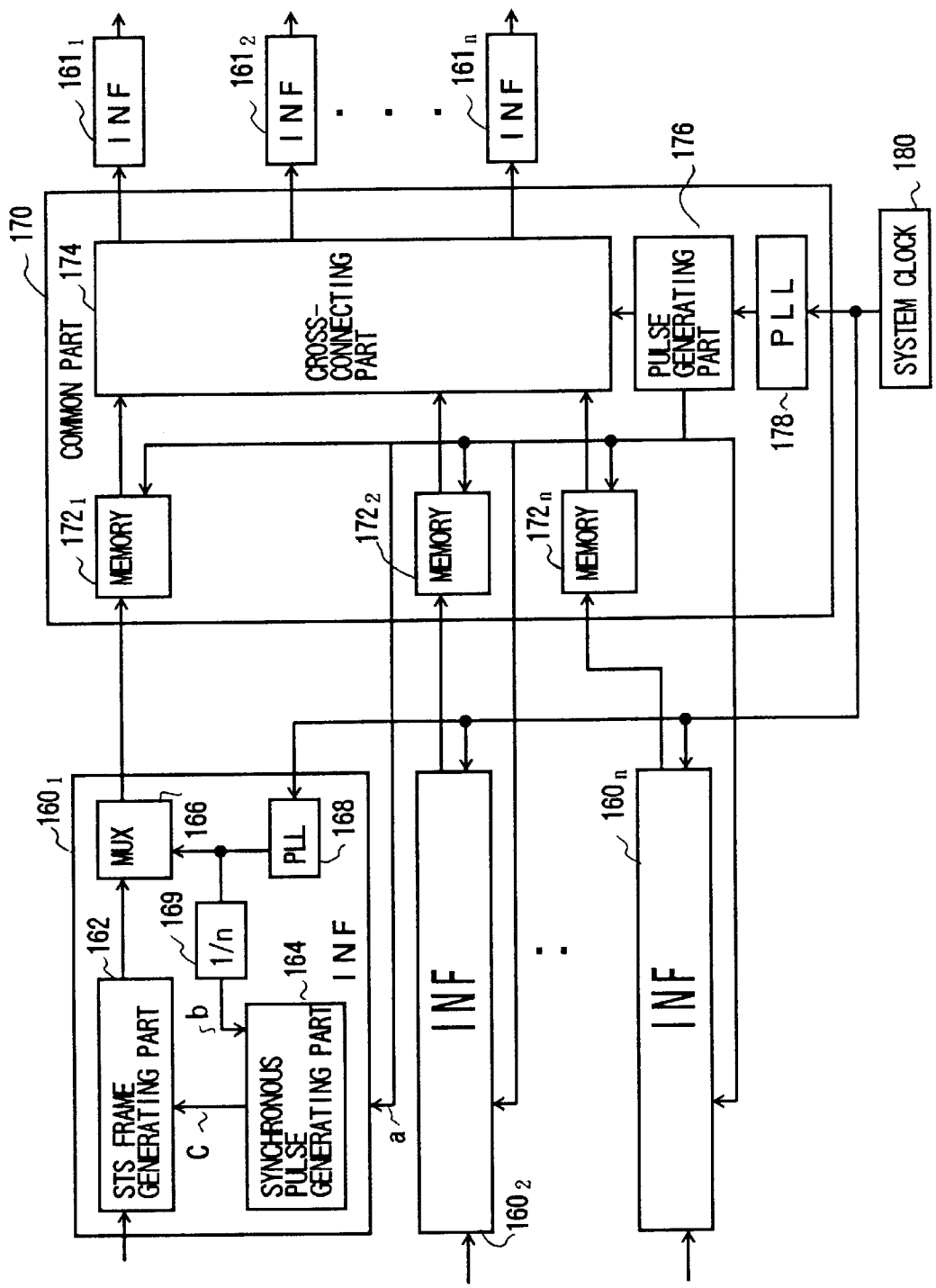
FIG. 15 is a block diagram showing a configuration for generating an STS signal and performing cross connecting according to an embodiment of the present invention.

FIG. 15 is a block diagram showing an embodiment of the present invention which corresponds to the third requirement. In FIG. 15, each signal input into each of interface (INF) parts $160_1$–$160_n$ is assembled into an STS frame in the interface (INF) parts $160_1$ $160_n$. At this time, phase adjusting is also performed. Fine phase adjustment of each channel and cross connecting are performed in a common part 170, and each channel is output to each of interface (INF) parts $161_1$–$161_n$. A system clock part 180 generates and distributes a reference clock in the transmission device. Each of the interface INF parts $160_1$–$160_n$ generates the STS frame according to a reference timing pulse distributed from a pulse generating part 176 in the common part 170, and outputs the STS frame to the common part 170.

Since each of the interface (INF) parts $160_1$–$160_n$ has the same configuration as that of the interface (INF) part $160_1$, only the interface (INF) part $160_1$ will be described in the following. An STS frame generating part 162 generates an STS frame according to a timing pulse after clock change which is generated by a synchronous pulse generating part 164. The generated frame is multiplexed by a MUX 166 and sent to the common part 170. A 1/n part (divider) 169 decreases the rate of the clock. A PLL 168 receives a clock from the system clock 180.

Fine phase adjustment is performed on an STS signal sent to the common part 170 in a memory $172_1$, and the signal is cross connected in a cross connecting part 174 and sent to the interface INF parts $161_1$–$161_n$. The cross-connecting part 174 and memories $172_1$–$172_n$, operates according to a timing pulse from the pulse generating part 176 which receives a clock from the PLL 178.

Figure 16:
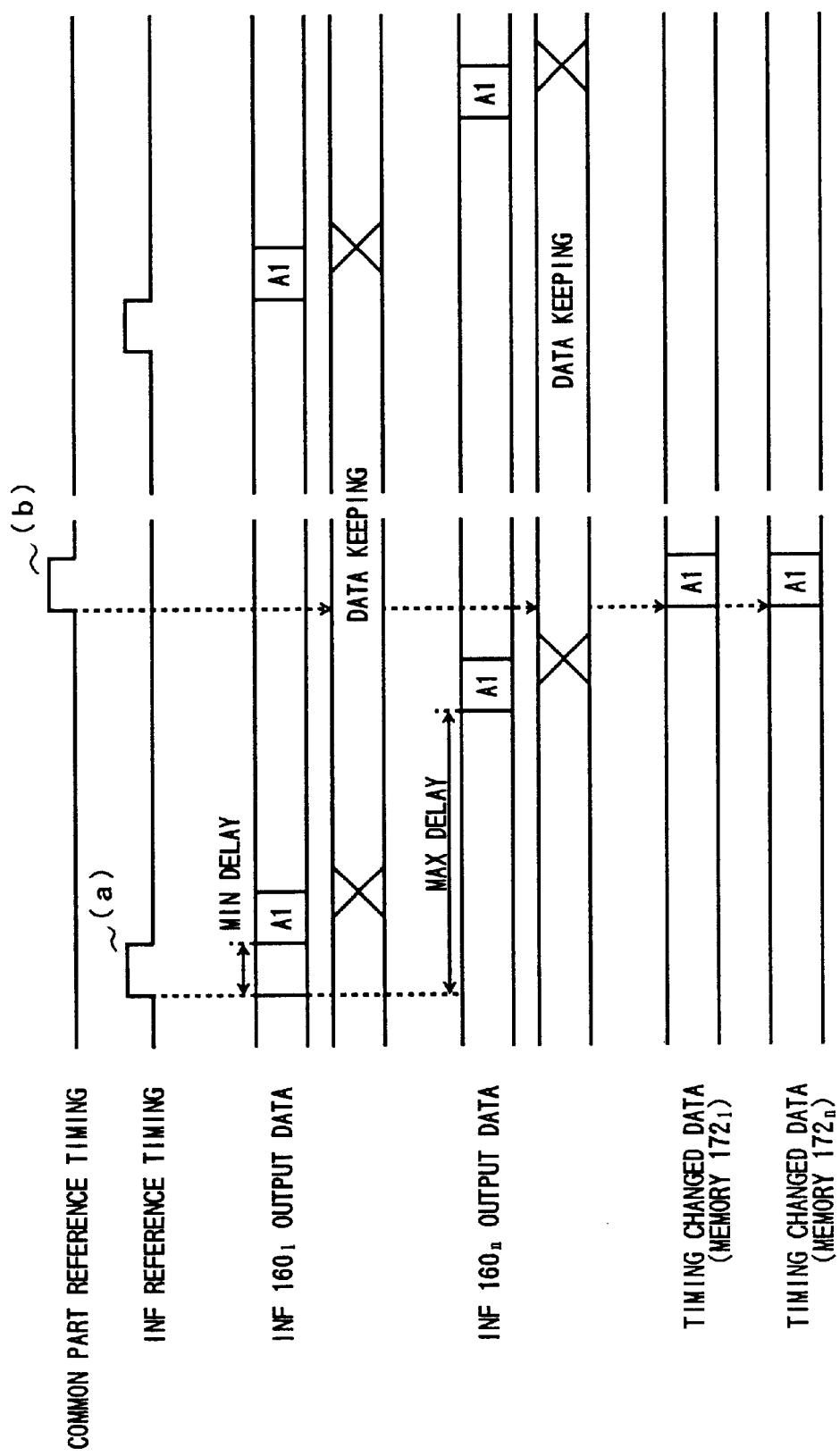
FIG. 16 is a time chart showing the operation of phase adjusting of STS signals according to an embodiment of the present invention.

FIG. 16 is a time chart showing the operation of the above-mentioned phase adjusting. As shown in FIG. 16, an STS frame is generated in each interface (INF) part according to the interface (INF) part reference timing (a) from the synchronous pulse generating part 164. Even when the frame is generated by the reference timing, a slight phase shift of the output data from each of the interface (INF) parts may occur (Min. Delay—Max. Delay). Therefore, the phase is finely adjusted by storing the data in the memories $172_1$–$172_n$, and reading out the data according to the common part reference timing (b) from the pulse generating part 176.

Figure 17:
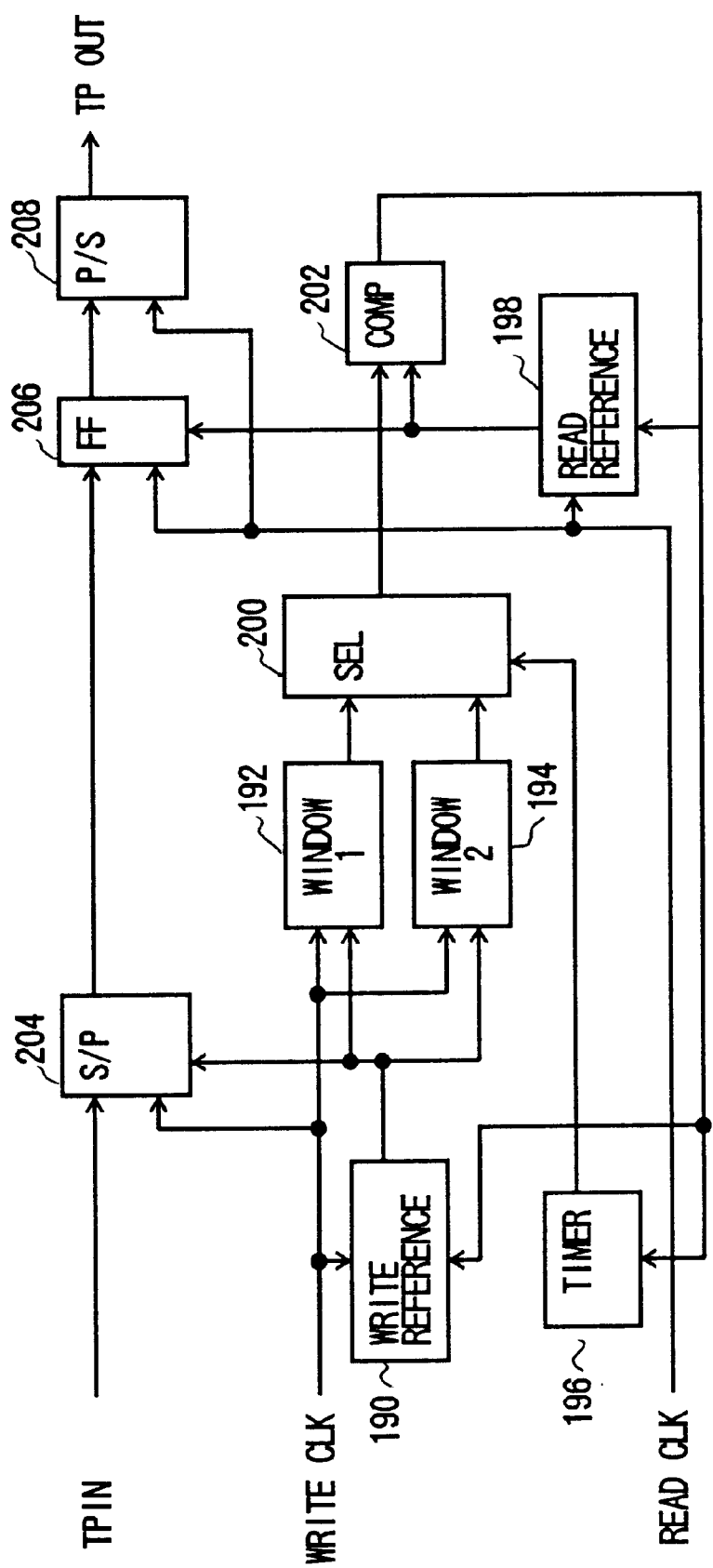
FIG. 17 is a block diagram of a synchronous pulse generating part 164 shown in FIG. 15.

FIG. 17 is a block diagram showing in detail the synchronous pulse generating part 164 in FIG. 5. The synchronous pulse generating part 164 generates a timing pulse for assembling input data into an STS frame.

In FIG. 17, a write reference part 190 generates timing for delaying a timing pulse in order to perform clock change and generates reference timing for generating windows. A window 1 (192) and a window 2 (194) are dual window generating parts in which a selector (SEL) 200 switches the window. A timer 196 manages the monitoring time for switching these windows. A read reference part 198 generates timing for reading the delayed timing pulse and generates timing for phase monitoring. A comparing part (COMP) 202 monitors the window and the phase of the read timing. A S/P 204 carries out serial-parallel conversion and a P/S 208 carries out parallel-serial conversion. A FF 206 is a flip-flop. In FIG. 17, the lines from TP IN and WRITE CLK correspond to "a" in the interface (INF) part 160$_1$ in FIG. 15, and the line from READ CLK corresponds to "b", and the line from TP OUT corresponds to "c".

Figure 18:
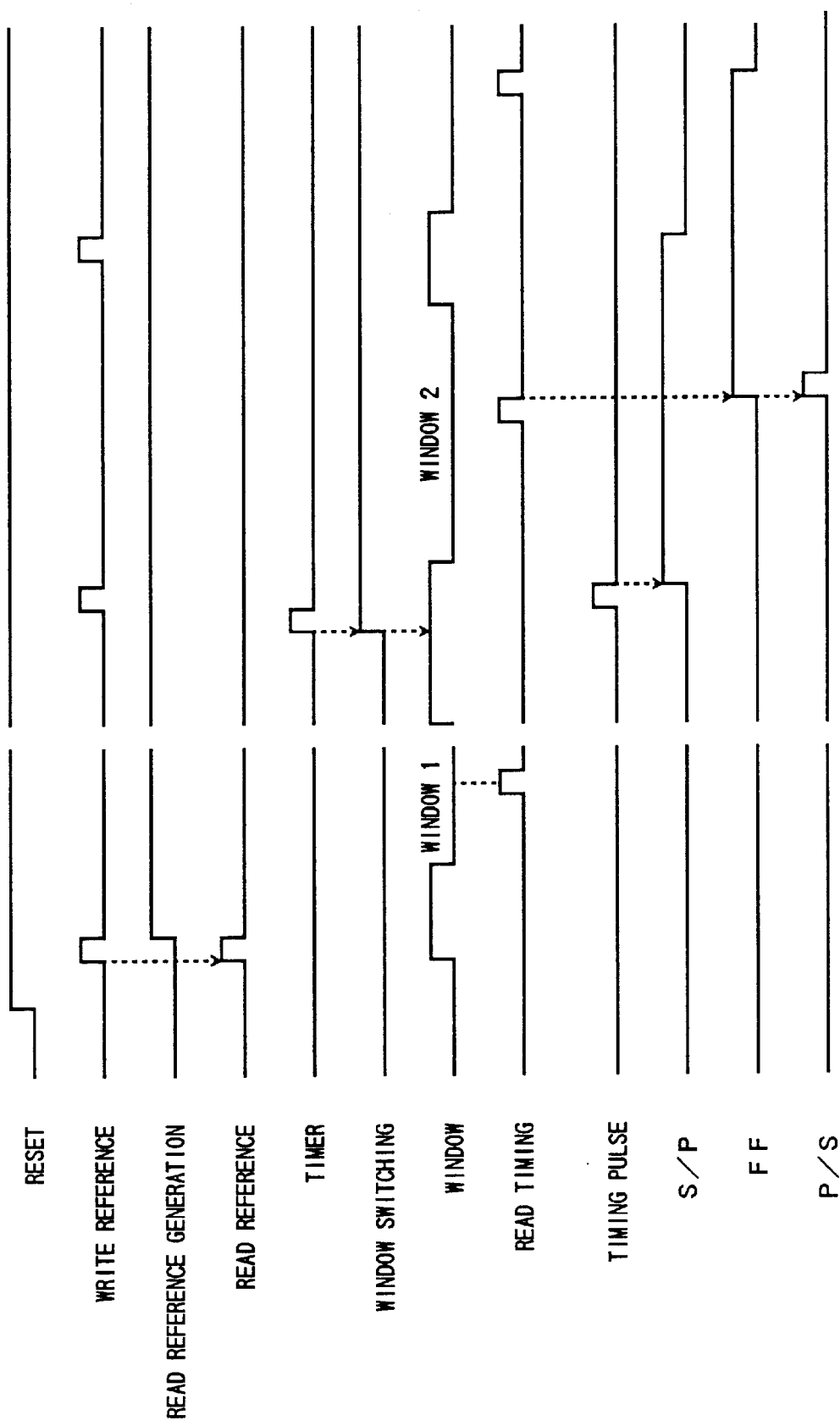
FIG. 18 is a time chart showing the operation of the synchronous pulse generating part 164 shown in FIG. 15.

FIG. 18 is a time chart showing the operation of the configuration of FIG. 17. The clock of the reading side is synchronized by the write reference timing, and a window is generated by the write reference timing. As shown in FIG. 18, during a monitoring period by the timer, since read timing is within the window 1 (narrower window), the window is switched to the window 2 (wider window) by the selector (SEL) 200 after the monitoring period. Thus, serial-parallel converted data is read according to the monitored read timing and is parallel-serial converted. If the comparing part 202 detects that the read timing is not within the window 1, the timer is reset and the monitoring process restarts.

Figure 19:
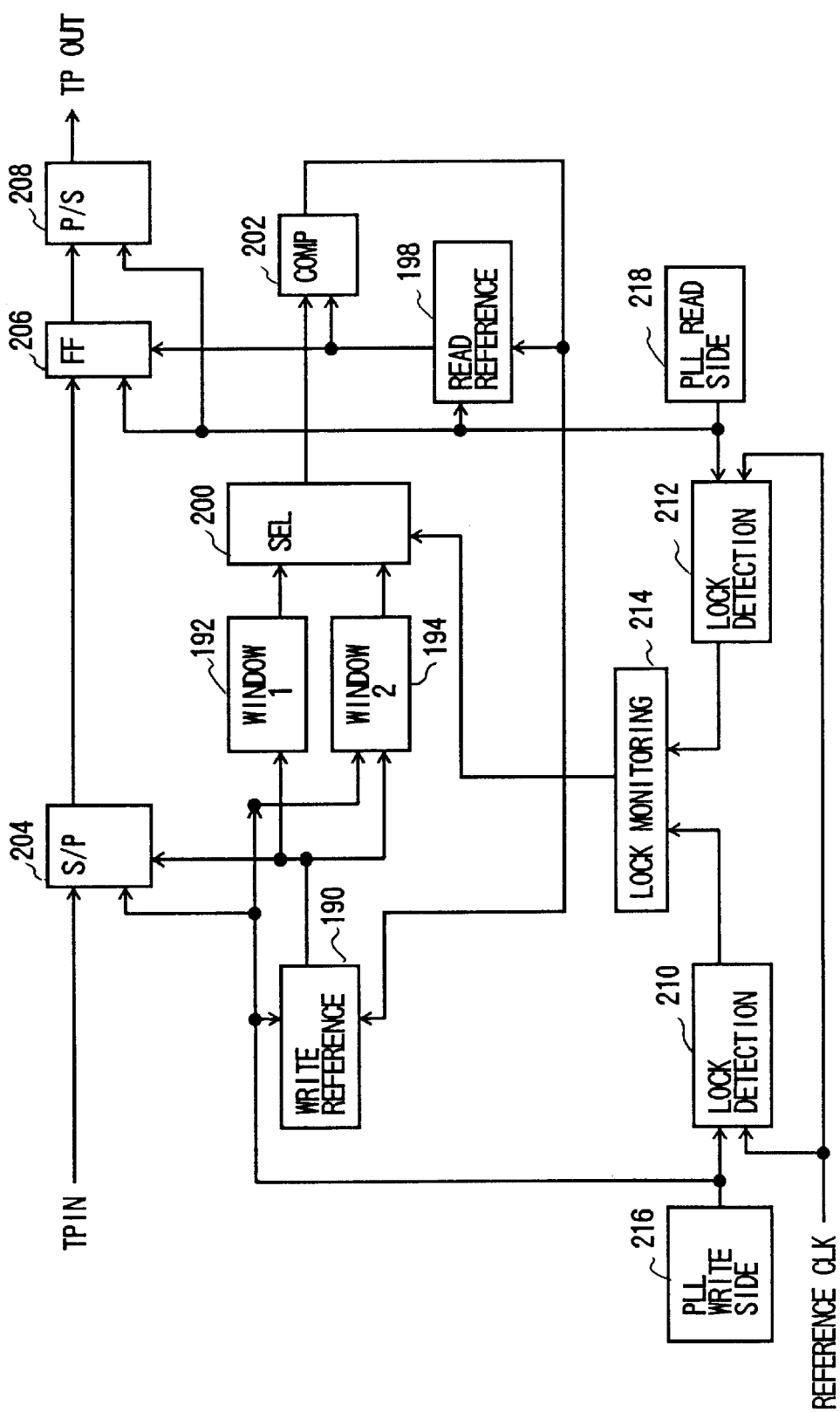
FIG. 19 is a block diagram of a configuration in which lock detecting parts 210, 212 and a lock monitoring part 214 are added to the configuration shown in FIG. 17.

FIG. 19 shows a configuration in which lock detection parts 210, 212 and a lock monitoring part 214 are added to the configuration shown in FIG. 17. The lock detection parts 210 and 212 detect a lock state of a PLL circuit and the lock monitoring part 214 monitors lock detection. In FIG. 19, a PLL 216 corresponds to the PLL 178 in FIG. 15 and a PLL 218 corresponds to the PLL 168. In this configuration, the window will be switched when the locked state is detected instead of using a timer.

According to the configuration shown in FIG. 17, the two windows are prepared for phase comparison in order to perform stable clock change, and the read timing is monitored by the narrower window during the monitoring period, and, then, if the read timing is normal during the period, the window is switched to the wider one. Therefore, reading data at an unstable position can be avoided because enough margin is allowed. Further, according to the configuration shown in FIG. 19, the window will be switched to the wider one after a lock of a PLL is detected. Therefore, the clock change will be performed more reliably.

As mentioned above, according to the present invention corresponding to the first requirement, the transmission device determines VT channels for inserting therein the alarm indication signal by using the memory area for the squelch table which has only the capacity of the VT channels targeted for BLSR which uses protection channels along a loop back route for restoration of a signal in the case of line failure, and, then, inserts the alarm indication signal into the corresponding channel by using cross-connecting information of main signal data. Therefore, an unnecessary memory area such as unnecessary registers is eliminated such that circuits are eliminated and the miniaturization can be realized.

Further, according to the present invention corresponding to the second requirement, since path monitoring start information is recorded by hardware in the path protection switch, the CPU can start the path monitoring period by only reading the path monitoring start information. And, since the path monitoring state can be generated by the hardware and can be established immediately when the condition for the path monitoring state is satisfied, skipping an event between CPU polling accesses can be avoided. Further, skipping an event between CPU polling accesses can be avoided without increasing CPU load because it is unnecessary to increase the number of CPU polling accesses. Therefore, efficiency of CPU processing can be achieved.

Furthermore, according to the present invention corresponding to the third requirement, since the pointer replacement circuit for phase adjusting is unnecessary in the common part, circuit concentration in the common part can be avoided, and miniaturization of the size of the transmission device and reduction of power consumption can be realized. Further, since the window is switched by using a timer in clock change of distributed reference timing, reading a timing pulse at an unstable position can be avoided. Further, since the lock state of the PLL circuit is monitored and a window is switched to a wider one after PLL locking, reliable clock change will become possible.

Therefore, according to the present invention, miniaturization of the transmission device can be realized and a transmission device of high stability and high reliability can be provided.

The present invention is not limited to the specifically disclosed embodiments, and variations and modifications may be made without departing from the scope of the invention.

What is claimed is:

1. A transmission device which cross connects channels associated with signals on a synchronous multiplex transmission network which forms a ring, and which performs restoration of communication by looping back the signals in a protection path when a failure occurs, said transmission device comprising:

a memory area which stores information for determining whether an alarm indication signal needs to be inserted in a channel or not, wherein the size of said memory area corresponds to the number of channels targeted for said restoration; and a part which inserts said alarm indication signal in a channel by switching results of said determination according to information for cross connection of the associated signals.

2. A transmission device which includes a part for switching a path by selecting either of two path signals on a synchronous multiplex transmission network which forms a ring and recovering said path after a time elapses from the time when said path is switched by using polling accesses by a CPU of said transmission device, wherein said transmission device switches said path and recovers said path without skipping an alarm event which arises and extinguishes between polling accesses by said CPU by retaining information indicating occurrences of said alarm event, reading said retained information by the CPU at a next polling access.

3. A transmission device which includes a part for switching and recovering a path by selecting either of two path signals on a synchronous multiplex transmission network which forms a ring, said transmission device comprising:

a switching part which switches a path when an alarm arises in said path;

a storing part which stores alarm information of every alarm arising and disappearing in a path;

a starting part which resets a timer and starts path monitoring by reading said alarm information; and a recovering part which recovers a switched path after a predetermined period of path monitoring.

4. The transmission device as claimed in claim 1, wherein said channel to which said alarm indication signal is inserted is a VT channel.

\* \* \* \* \*